March 13, 1956　　R. W. JOHNSON　　2,737,880
COFFEE MAKERS
Filed Dec. 14, 1951　　3 Sheets-Sheet 1
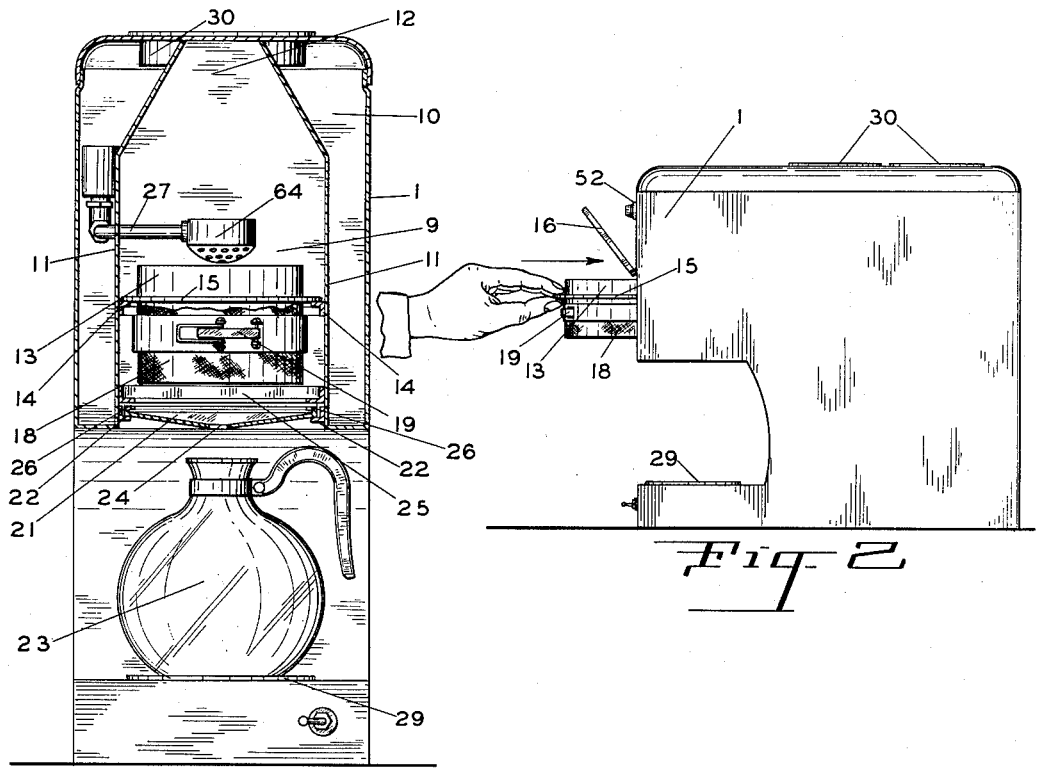
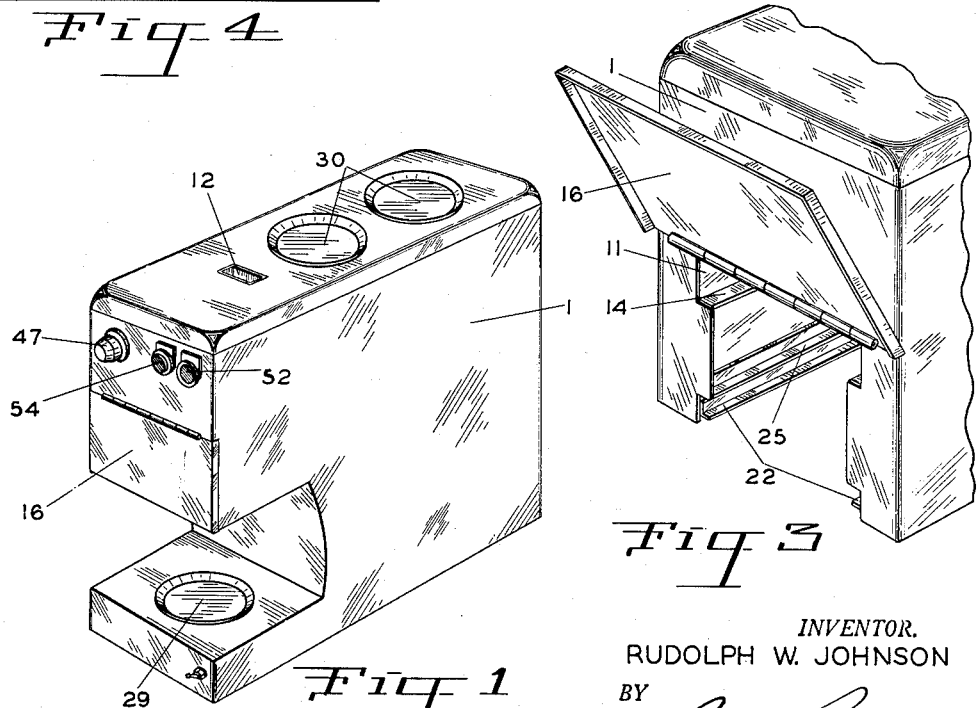
INVENTOR.
RUDOLPH W. JOHNSON
BY
ATTORNEY

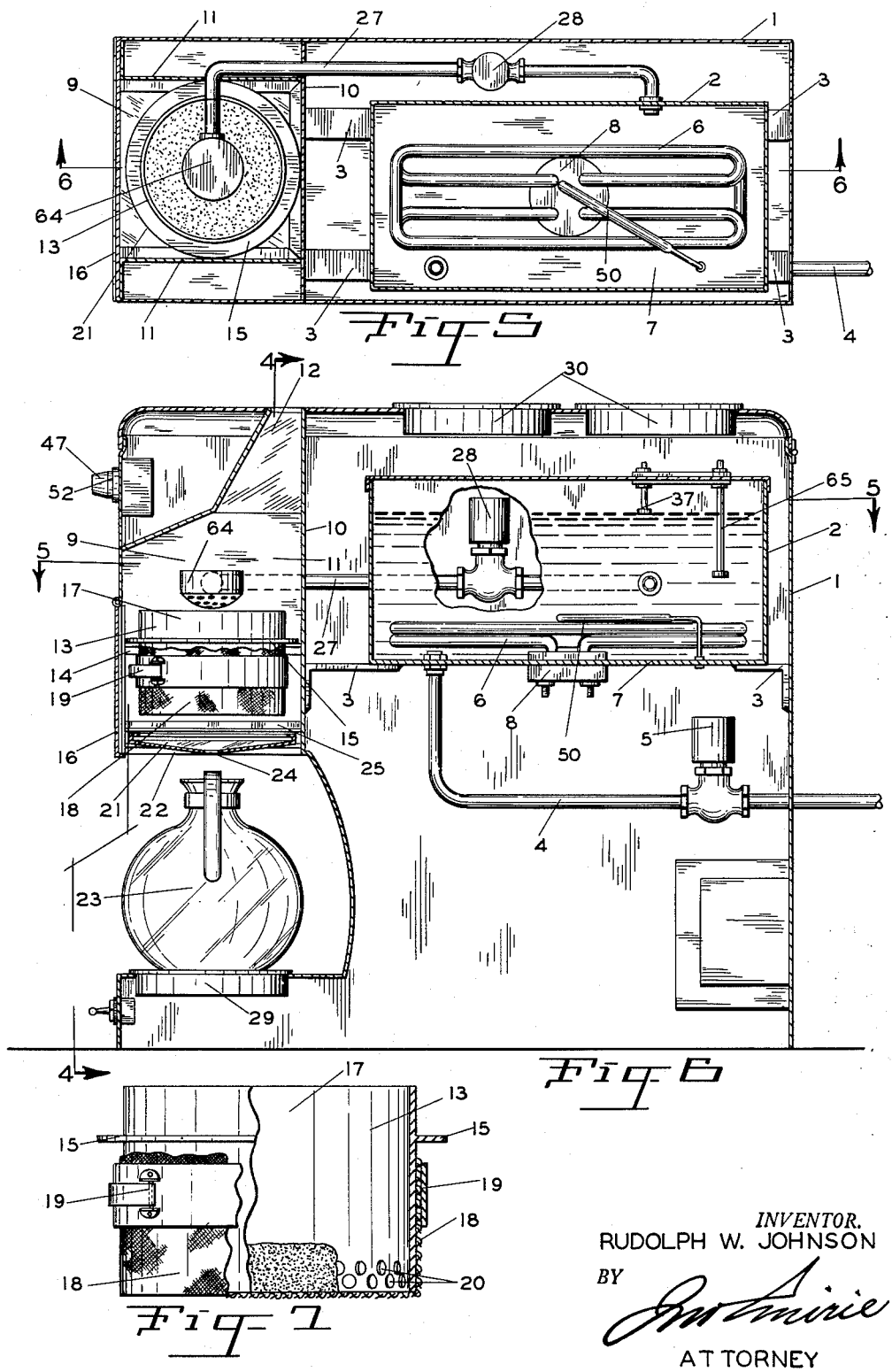

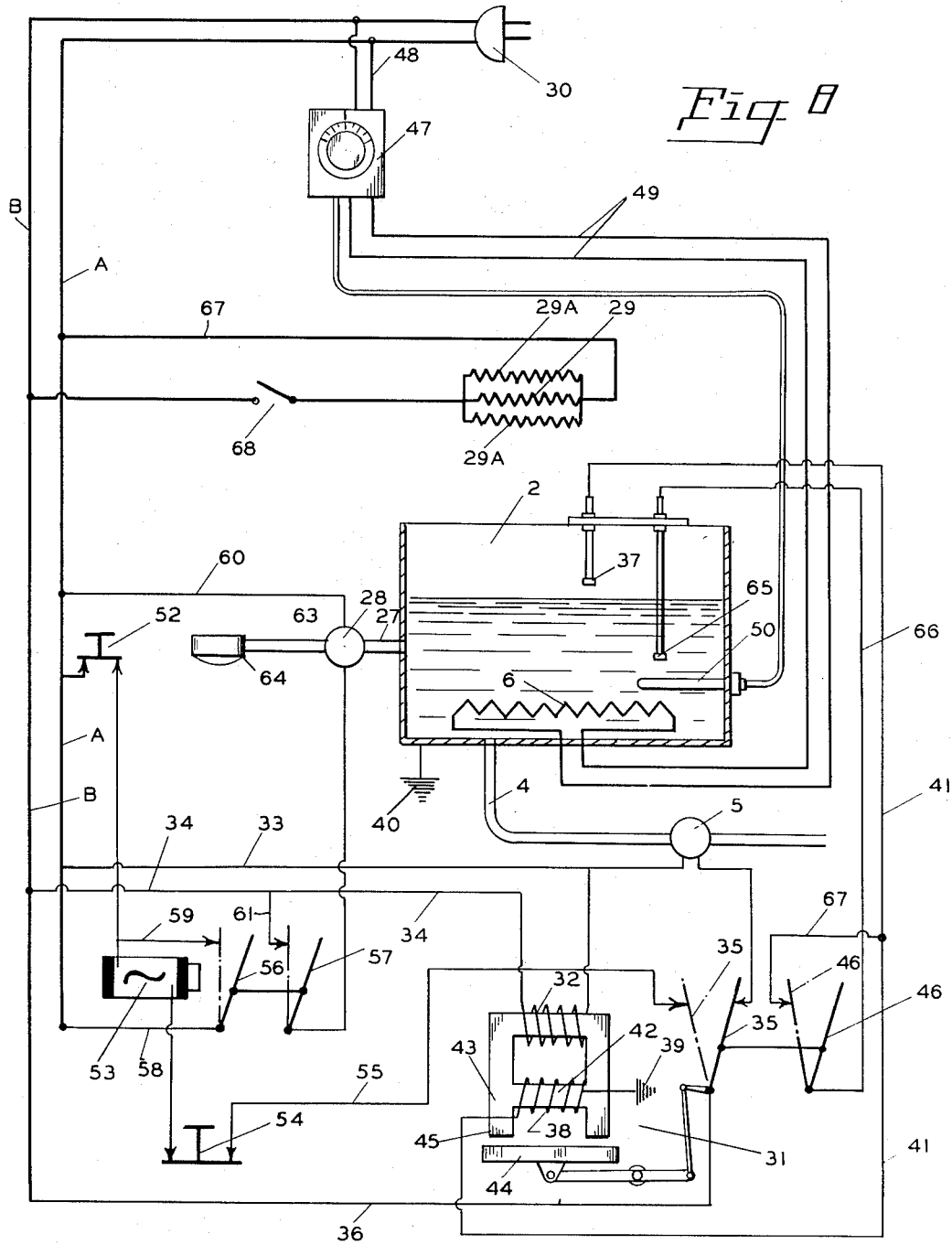

United States Patent Office 2,737,880
Patented Mar. 13, 1956

2,737,880

COFFEE MAKERS

Rudolph W. Johnson, Portland, Oreg., assignor to Boyd Coffee Company, Portland, Oreg.

Application December 14, 1951, Serial No. 261,721

5 Claims. (Cl. 99—305)

This invention relates to coffee makers and is particularly adapted to the drip method of making coffee.

One of the objects of this invention is to provide a coffee maker that will measure the exact amount of water to a predetermined amount of coffee, insuring the proper proportion of each.

Another object of the invention is to control the temperature of the water to the exact desired temperature while making coffee.

A still further object of the invention is to take the human element and guess work out of the making of coffee. All the operator has to do is to start the cycle of operation and the making of the coffee will be controlled automatically.

These and other incidental objects will be apparent in the drawings, specification and claims.

Referring to the drawings:

Figure 1 is a perspective view of my new and improved coffee maker.

Figure 2 is a side view of Figure 1, illustrating how the coffee cartridge is removed or replaced within the coffee maker.

Figure 3 is a fragmentary perspective view of the coffee cartridge chamber.

Figure 4 is an end sectional view, taken on line 4—4 of Figure 6.

Figure 5 is a plan sectional view, taken on line 5—5 of Figure 6.

Figure 6 is a sectional view, taken on line 6—6 of Figure 5.

Figure 7 is a sectional view, taken through the coffee cartridge.

Figure 8 is a diagrammatical and electric wiring diagram.

Referring more specifically to the drawings:

My new and improved coffee maker consists of a cabinet 1, having a hot water tank 2 mounted therein by the brackets 3. Water is supplied to the tank 2 by way of the piping 4 and the said water is controlled by the solenoid valve 5. The automatic operation of which will be later described.

The water within the tank 2 is heated by the thermostatically controlled heating element 6, which is mounted to the bottom 7 of the tank 2 by the usual insulated electrical connection 8. The coffee making compartment consists of the space 9 surrounded by the partition 10 and the side walls 11. This compartment has a vent 12 for venting the same in the releasing of condensation.

A coffee cartridge 13 is adapted to be supported within the compartment 9 on the rails 14 by way of its outwardly extending flange 15. This cartridge is entered into the compartment 9 through the hinged door 16, as best illustrated in Figure 2. The cartridge 13 consists of the cylindrical container 17, which is adapted to receive the filter cloth 18 which covers the bottom of the cartridge and is brought up over the sides and clamped thereon by the well known clamp 19. Openings 20 may be formed adjacent the bottom of the cartridge for assisting in the filtering of the coffee from the cartridge.

A drip pan 21 is located at the bottom of the coffee making compartment 9 and is supported by the rails 22. It also is entered through the opening covered by the door 16. This drip pan is adapted to catch the finished brewed coffee from the cartridge 17, delivering the same into the coffee pot 23 by way of the opening 24. Baffles 25 overlap the edges 26 of the drip pan so as to catch the condensation formed on the side walls of the compartment 9. Hot water is delivered from the tank 2 into the cartridge 17 by the piping 27 and is controlled by the operation of the solenoid valve 28.

In order to maintain the coffee having been delivered to the coffee pot 23 in a warm condition, the same rests on an electric heating unit 29 and when the pot is filled it can be transferred to the heating units 29A for maintaining the same in a warm condition.

I will now describe the operation of my new and improved coffee maker. Referring to Figures 5, 6 and 8, in Figure 8 when the plug 30 is plugged into the electric source of supply, we will assume that the water tank is approaching its filled condition, and at this time the solenoid valve 5 is admitting water into the same. The operation of the solenoid valve 5 is controlled in the following manner.

An induction relay is indicated at 31, its primary coil 32 is constantly supplied with electrical energy from the main lines A and B, which is connected to the plug 30, the coil 32 receiving energy from these supply lines by way of the conductors 33 and 34. The solenoid valve 5 receives its electric energy from the conductor 33, the circuit being completed through the switch bar 35 to the conductor 36, back to the main line B.

When the water level reaches the electrode 37, the secondary coil 38 of the induction relay 31 will deliver energy through the ground 39 into the ground 40 of the tank 2, through the water and to the electrode 37, completing the circuit through the conductor 41, and through the secondary coil 38. When the secondary coil 38 is energized, its magnetic field opposes the flow of magnetic lines created by the coil 32 and passing through the core 42. This causes the magnetic lines of force within the main core 43 to attract the armature 44 to the tips 45 of the core 43. This moves the switch bars 35 and 46 to the broken line position, which breaks the electric circuit through the solenoid valve 5, shutting off the water supply through the pipe 4 and into the tank 2.

In the operation of the coffee maker, the thermostatic switch 47 is turned on. This delivers electric energy from the main lines A and B through the conductors 48, thermostatic switch 47, conductors 49 into the heating element 6. When the temperature rises to the predetermined temperature required, the thermostatic control bulb 50 will open the switch not here shown within the thermostatic control 47. When the temperature of the water falls, the bulb 50 will again close the switch within the thermostatic control switch 47, again energizing the heating element 6, thereby maintaining the temperature of the water at a predetermined degree.

In the making of coffee, the coffee is placed in the cartridge 13 as illustrated in Figure 7, and the cartridge is entered into the coffee making chamber 9, as best illustrated in Figure 2. The door 16 is closed as illustrated in Figure 6. Next the switch 52 is closed. This delivers electrical energy from line A through the said switch to the A. C. relay 53 through the switch 54, through the conductor 55, and through the switch bar 35 illustrated in broken line, and into the conductor 36 back to the main line B.

The switch 52 is only closed momentarily, but when the switch bar 56 of the relay has been operated to the broken line position by the switch 52, electric energy will flow through the conductor 58 from the main line A through the conductor 59 into the relay 53, holding the switch bars in the broken line position. When the relay 53 was operated bringing the bars 56 and 57 to the broken line position, electric energy will flow from the main line A by way of the conductor 60, solenoid valve 28, switch bar 57 and back to the main line B by way of the conductor 61, opening the said solenoid valve 28, permitting the hot water from the tank 2 to flow through the pipe 27, valve 28, pipe 63, into the drip head 64, passing down through the coffee, out through the filter cloth 18 and into the coffee pot 23.

When the level of the water within the tank 2 leaves the electrode 37, the winding 38 of the induction relay 31 will continue to be energized through the electrode 65, conductor 66, switch bar 46, conductor 67, conductor 44, winding 38, ground 39 and back to the water through the ground 40. The electrode 65 performing a holding action on the induction relay switch 31.

As the water travels on down below the tip of the electrode 65 it will break this above electrical circuit, allowing the induction relay to open or to move to the position illustrated in the full lines. This will arrest or stop the flow of water from the tank and out of the drip nozzle 64.

When the relay switch bar 35 moved from its broken line position the electric circuit was broken through the relay 53 from the main line A, switch 54 and conductor 55. When the switch bar 35 is in the full line position, it will again energize the solenoid valve 5 from the main line A, conductor 33, switch bar 35, conductor 36 and back to the line B until the water level again contacts the electrode 37, at which time the coil 38 of the induction relay will be energized, pulling the switch bars 35 and 46 back to the broken line position, breaking the circuit through the solenoid valve 5, stopping the intake of water into the tank 2. My coffee maker will remain in this condition until the switch 52 is again closed, starting another cycle of operation.

The solenoid valve 28 can be closed at will by opening the switch 54. When this switch is opened the relay 53 will open the circuit through the solenoid valve 28, shutting off the water supply to the drip nozzle 64.

The heating elements 29 and 29A receive their electrical energy from the main line A through the conductor 67 and are controlled by the switch 68.

From the above description it can be readily understood that the amount of coffee can be measured going into the coffee cartridge 13 and that the amount of water being dispensed through the drip nozzle 64 can be automatically controlled, also the temperature of the water can be automatically controlled.

Further, the making of the coffee is controlled by pressing a button, the making of coffee being automatic from there on, and that the brewed coffee can be maintained in a warm condition while additional coffee is being made, therefore little attention is required from the operator in the making of coffee.

What I claim is:

1. A coffee maker comprising a housing, a reservoir in said housing, a closed drip compartment in the front and at the upper part of said housing and having an opening at the bottom, a door in the front of said housing and opening into said drip compartment, guides on the sides of said drip compartment and in line with said door, a drip filter element removably supported by said guides in said drip compartment and insertable through the door opening, said drip compartment being in the upper part of said housing to accommodate a receptacle thereunder, a discharge pipe extending from said reservoir into said drip compartment above said drip filter, a dished drip pan insertable through the door opening and being removably mounted in the lower end of said drip compartment beneath the filter, a drip-nozzle on said pipe for discharging water into said filter, a control valve in said pipe, and a heater in said reservoir.

2. A coffee maker comprising a housing, a reservoir in said housing, a closed drip compartment in the front of said housing and at the upper part of said housing to accommodate a receptacle thereunder, drip filter means removably mounted in said drip compartment, a discharge pipe from said reservoir into said drip compartment and opening over said filter means, a condensation eliminating vent opening from the top of said drip compartment through the top of said housing, a door in the front of said drip compartment and giving access to said drip filter means, rails on the opposite sides of said compartment for removably supporting said drip filter means, a dished drip pan insertable through the door opening and removably mounted in the lower end of said drip compartment beneath said filter means, and baffles on the walls of said drip compartment overlapping the edges of said drip pan.

3. A coffee maker as defined in claim 2, wherein a heating element is mounted in the bottom of said housing and spaced beneath said drip compartment for supporting a receptacle.

4. A coffee maker comprising a housing, a reservoir in said housing, a closed drip compartment in the front and at the upper part of said housing and having an opening at the bottom, a door in front of said housing and opening into said drip compartment, a drip filter element removably supported in said drip compartment and insertable through the door opening, said drip compartment being in the upper part of said housing to accommodate a receptacle thereunder, a discharge pipe extending from said reservoir into said drip compartment above said drip filter for discharging water thereinto, a dished drip pan mounted in the lower end of said drip compartment beneath the filter, a control valve in said pipe and a heater in said reservoir.

5. A coffee maker comprising a housing, a reservoir in said housing, a closed drip compartment in the front and at the upper part of said housing and having an opening at the bottom, a door in front of said housing and opening into said drip compartment, a drip filter element removably supported in said drip compartment and insertable through the door opening, said drip compartment being in the upper part of said housing to accommodate a receptacle thereunder, a discharge pipe extending from said reservoir into said drip compartment above said drip filter for discharging water thereinto, a dished drip pan insertable through the door opening and being removably mounted in the lower end of said drip compartment beneath the filter, a control valve in said pipe and a heater in said reservoir.

References Cited in the file of this patent

UNITED STATES PATENTS

| Number | Name | Date |
|---|---|---|
| 1,346,898 | Kingsbury | July 20, 1920 |
| 1,528,601 | Bozzalla | Mar. 3, 1925 |
| 1,665,728 | Camright | Apr. 10, 1928 |
| 1,820,981 | Fever | Sept. 1, 1931 |
| 1,882,247 | Levings | Oct. 11, 1932 |
| 1,922,782 | Schallis | Aug. 15, 1933 |
| 2,067,918 | Harper | Jan. 19, 1937 |
| 2,114,063 | Stoner | Apr. 12, 1938 |
| 2,241,990 | Gehlert | May 13, 1941 |
| 2,245,389 | Cremer | June 10, 1941 |
| 2,487,933 | Martin | Nov. 15, 1949 |
| 2,488,817 | Kaminky | Nov. 22, 1949 |
| 2,490,501 | Ashenden | Dec. 6, 1949 |
| 2,493,932 | Swanson | Jan. 10, 1950 |
| 2,544,836 | Hotvedt | Mar. 13, 1951 |
| 2,551,219 | Peters et al. | May 1, 1951 |
| 2,565,235 | Johnson | Aug. 21, 1951 |
| 2,568,840 | Zees | Sept. 25, 1951 |
| 2,569,820 | Locke | Oct. 2, 1951 |
| 2,641,992 | Clemens | June 16, 1953 |
| 2,644,478 | Calabrese | July 7, 1953 |
| 2,706,444 | Chaplik | Apr. 19, 1955 |